US012631714B2

(12) United States Patent
Micallef et al.

(10) Patent No.: US 12,631,714 B2
(45) Date of Patent: May 19, 2026

(54) POSITIONING SYSTEM AND METHOD FOR LOW-POWER INFRASTRUCTURE DEVICES

(71) Applicant: RedLore Canada Inc., Dunrobin (CA)

(72) Inventors: David Micallef, Rabat (MT); Niek Van Dierdonck, Dunrobin (CA)

(73) Assignee: RedLore Canada Inc., Duarobin (CA)

( * ) Notice: Subject to any disclaimer, the term of this patent is extended or adjusted under 35 U.S.C. 154(b) by 396 days.

(21) Appl. No.: 18/212,786

(22) Filed: Jun. 22, 2023

(65) Prior Publication Data

US 2024/0426967 A1 Dec. 26, 2024

(51) Int. Cl.
*G01S 5/02* (2010.01)

(52) U.S. Cl.
CPC .......... *G01S 5/0284* (2013.01); *G01S 5/0252* (2013.01)

(58) Field of Classification Search
CPC ........ G01S 13/765; G01S 5/10; G01S 5/0284;
G01S 1/0428; G01S 13/876; G01S 13/76;
G01S 5/02; G01S 5/0205; G01S 5/14;
G01S 5/0009; G01S 5/0268; G01S 5/06;
G01S 5/0252; G01S 1/024; H04B
2201/71634; H04W 64/00; H04W 4/80;
H04W 4/023; H04W 4/029
See application file for complete search history.

(56) References Cited

U.S. PATENT DOCUMENTS

| | | | |
|---|---|---|---|
| 7,768,394 B2 | 8/2010 | Amidi | |
| 2010/0177681 A1* | 7/2010 | Sahinoglu | G01S 13/46 |
| | | | 370/328 |
| 2019/0219665 A1* | 7/2019 | Ye | G01S 5/10 |
| 2019/0380311 A1 | 12/2019 | Crouthamel | |
| 2022/0343342 A1 | 10/2022 | Kovacs et al. | |
| 2023/0217211 A1* | 7/2023 | Duan | G01S 5/0289 |
| | | | 370/329 |
| 2025/0039826 A1* | 1/2025 | Reddy | H04W 64/00 |

FOREIGN PATENT DOCUMENTS

| | | | |
|---|---|---|---|
| CN | 101435867 A | 5/2009 | |
| CN | 101435876 B | 7/2011 | |
| WO | 9635196 A1 | 11/1996 | |
| WO | WO-2023163864 A1 * | 8/2023 | H04W 74/0816 |

* cited by examiner

*Primary Examiner* — Olumide Ajibade Akonai
(74) *Attorney, Agent, or Firm* — Stratford Group Ltd.

(57) ABSTRACT

Described are various embodiments of a system and method for positioning an asset with a tag optimized for low-power infrastructure devices. In one embodiment, the method includes transmitting, by a serving anchor of a plurality of anchors having designated locations, during a ranging slot time period of the serving anchor, one or more anchor ranging messages. Sending, by one or more participating anchors in range of the serving anchor, each during the ranging slot time period, a return ranging message. Recording, by the serving anchor, a first timing data and by a tag positionally associated with the asset a second timing data. estimating, from said first timing data and said second timing data, either by the central entity alone or by a combination of the serving anchor and central entity, a position of the tag.

20 Claims, 7 Drawing Sheets

POSITIONING SYSTEM AND METHOD FOR LOW-POWER INFRASTRUCTURE DEVICES

FIELD

The present disclosure relates to wireless positioning and ranging technologies, and more particularly to a positioning system and method for low-power infrastructure devices.

BACKGROUND

Real-Time Location Systems (RTLS) are increasingly adopted across many industries to track the location of assets. An asset can be inventory (e.g., raw materials, work in process, finished products), a container that holds such inventory, equipment (e.g. welding stations, power tools, forklifts) and people. The applications of RTLS's are multiple: real-time inventory, automatic process tracking, guarding people from entering secure or hazardous zones, etc. The economic benefits are efficiency improvement, higher productivity, lower susceptibility to human error, and employee safety.

Some less accurate RTLSs are based on signal strength or RSSI (Received Signal Strength Indication). The anchor-tag distance is estimated by comparing the strength of the wireless signal as sent by the transmitter (either tag or anchor) with that of the receiver (either anchor or tag). The reduction of the signal strength is a measure for the distance travelled. The problem with this approach is that any object on the line of sight between the transmitter and the receiver will disrupt the relation between signal strength reduction and distance and thus add to the inaccuracy of the distance estimation, resulting in a larger error in the position estimation.

More accurate RTLS systems are based on the time it takes for a signal to travel from the transmitter (tag or anchor) to the receiver (anchor or tag). The signal can be of various natures such as radiofrequency (as implemented in the Ultra-Wide Band or UWB standard), ultrasound or others. Such systems are grouped under the name Time-of-Flight (ToF). In ToF systems the distance the message has traveled through a given medium can be derived from the time of flight of a wireless message by multiplying the latter by the speed of flight through that medium. For example, if the message is carried by a radiofrequency signal through air, then the speed of flight is the speed of light in air. In real-life environments the signal must often travel through other media besides air, such as the objects made of plastics, water and other materials, which can have a different speed of flight. But as air is usually the dominant medium along the path of travel, the resulting loss of accuracy is usually small.

ToF systems further break down into Two-Way Ranging (TWR) and Time Difference of Arrival (TDoA) systems.

In TWR the time of flight between a transmitter and a receiver is measured directly and then converted into a distance using the approach explained above. As the transmitter and the receiver are usually not time-synchronized, most often the original receiver transmits a message back to the original transmitter, thus acting as the new receiver. A message is thus transmitted back and forth, hence the name Two-Way Ranging. The original transmitter can now calculate the one-way time of flight by subtracting the original transmission time from the new reception time, then subtracting from this time difference the processing time the original receiver had required between the original reception time and the new transmission time, a value which is communicated by the original receiver to the new receiver in the return message, and then dividing the result of this calculation by two to account for the fact that a message travelled twice the distance between the devices. The disadvantages of TWR are multiple, such as the need to send and receive 2 messages per estimated distance and thus a higher total energy consumption, a larger error, in part because of the additional time uncertainty through the double transmission, etc.

TDoA gets rid of some of the TWR disadvantages by only requiring a single transmission per distance estimate. The tag sends a message to the several anchors within wireless range. The anchors receive the tag's message at different moments in time, where the differences in arrival time are due to the varying distances between the tag and each anchor. In state-of-the-art TDoA the anchor's clocks are all synchronized and thus a common reference time can be established between the anchors. The TDoA methods have an important drawback: the clocks of the anchors need to have the same time-base (i.e. they must agree on a common absolute time). In addition, the clocks need to stay synchronized. These requirements are technically complex and costly to achieve and conflicts with the need to keep anchors low-cost. TDoA typically use atomic clocks or rely on clock synchronization methods that require anchors to be in an active state all the time in order to receive anchor-synchronization messages. An active state requires an amount of power which is not compatible with a battery powered device. Such a battery would either be very large and thus uneconomical as well as very bulky, or it would last for only weeks or months at best after which a battery replacement or recharge is required, which is not practically feasible and would be costly to undertake. As a result, anchors in traditional TDoA solutions are externally powered, either through the mains power supply that is brought to the anchor, or, using a power distribution network such as Power-over-Ethernet (POE), or any other wired power distribution solution.

Bringing wired power to the anchors is a big burden in any operational setting. The cost of labor and materials usually overshoots the price of the anchor equipment by a factor of 2 to 5. In addition, the long installation times of the wired infrastructure often conflicts with the on-going operations on site. Halting those operations during installation presents an additional opportunity cost. A battery-operated solution that operates for years without the need for battery replacement or recharging would solve these problems.

This background information is provided to reveal information believed by the applicant to be of possible relevance. No admission is necessarily intended, nor should be construed, that any of the preceding information constitutes prior art or forms part of the general common knowledge in the relevant art.

BRIEF SUMMARY

The following presents a simplified summary of the general inventive concept(s) described herein to provide a basic understanding of some aspects of the disclosure. This summary is not an extensive overview of the disclosure. It is not intended to restrict key or critical elements of the embodiments of the disclosure or to delineate their scope beyond that which is explicitly or implicitly described by the following description and claims.

A need exists for positioning systems and methods for low-power infrastructure devices. Some aspects of disclosure provide embodiments of such systems and methods.

In accordance with one aspect, there is provided a computer-implemented method for positioning an asset, comprising the steps of: transmitting, by a serving anchor of a plurality of anchors having designated locations, during a ranging slot time period of said serving anchor, one or more anchor ranging messages; transmitting, by one or more participating anchors in range of said serving anchor, each during said ranging slot time period, a return ranging message; recording, by the serving anchor, a first timing data of when said plurality of ranging messages are sent and when said return ranging messages are each received by the serving anchor from each participating anchor; recording, by a tag positionally associated with said asset, during said ranging slot time period of the serving anchor, a second timing data of when each of said one or more anchor ranging messages and each return ranging message is received by the tag; and estimating, from said first timing data and said second timing data, either by the central entity alone or by a combination of the serving anchor and central entity, a position of the tag.

In one embodiment, estimating is done, at least in part by: determining a time difference of departure (TDoD) of each return ranging message received by the serving anchor, and a time difference of arrival (TdoA) of the return ranging message from each participating anchor received by the tag; calculating a time difference of flight (TdoF) from said TdoD and TdoA; and computing said position of the tag via said TdoF.

In one embodiment, the one or more anchor ranging messages comprise a ranging slot start (RSS) message transmitted at the start of the ranging slot time period; and the return ranging message is a ranging slot timing (RST) message.

In one embodiment, the one or more of anchor ranging messages further comprises a ranging slot end (RSE) message sent at the end of the ranging slot time period; and during said calculating, clock skew between the serving anchor and the tag is corrected at the central authority by comparing the time difference between when the RSS and RSE were sent by the serving anchor and when the RSS and RSE were received by the tag.

In one embodiment, the serving anchor is selected by the tag from the plurality of anchors.

In one embodiment, the selection is made by the tag based on one or more of: a strongest signal criterion, a line-of-sight quality criterion, an earliest ranging slot time criterion, or a highest number of anchors participating in said ranging slot time period criterion.

In one embodiment, each anchor from said plurality of anchors chooses a corresponding ranging slot time period.

In one embodiment, the method further comprises the step of, before said transmitting: periodically sending, by each anchor, a discovery message encoding a time delay between a sending time of the discovery message and a start time of the corresponding ranging slot time period of the anchor; recording, by each neighboring anchor in range of said anchor, said start time.

In one embodiment, upon a neighboring anchor detecting that the corresponding ranging slot time period of the anchor collides with the corresponding ranging slot time period of that neighboring anchor, selecting, by the neighboring anchor, a new corresponding ranging slot time period.

In one embodiment, a transceiver of the serving anchor is turned on at the start of said ranging slot time period and turned off after said ranging slot time period to conserve power.

In accordance with another aspect, there is provided a system for positioning an asset, comprising: a tag positionally associated with the asset and a plurality of anchors each having a designated location, said tag and said anchors each comprising a processor operatively coupled to a memory and a transceiver; and wherein a serving anchor designated from said plurality of anchors is configured to transmit during a ranging slot time period of said serving anchor, one or more anchor ranging messages; wherein one or more participating anchors in range of said serving anchor are configured to each at a time during said ranging slot time period send a return ranging message; wherein the serving anchor is further configured to record in the memory of said serving anchor a first timing data of when said one or more anchor ranging messages are sent and when said return ranging messages are each received by the serving anchor from each participating anchor; wherein said tag is further configured to record in the memory of the tag, during said ranging slot time period, a second timing data of when each of said one or more anchor ranging messages and each return ranging message is received by the tag; the system further comprising a central authority communicatively coupled to said tag and said serving anchor via a network; and wherein either the central entity alone or a combination of the serving anchor and central entity are further configured to estimate, from said first timing data and said second timing data, a position of the tag.

In one embodiment, the estimating is done, at least in part, by: determining a time difference of departure (TdoD) of each return ranging message received by the participating anchor, and a time difference of arrival (TdoA) of the return ranging messages from each participating anchor received by the tag; calculating a time difference of flight (TdoF) from said TdoD and TdoA; and computing said position of the tag via said TdoF.

In one embodiment, the one or more anchor ranging messages comprise a ranging slot start (RSS) message transmitted at the start of the ranging slot time period; and the return ranging message is a ranging slot timing (RST) message.

In one embodiment, the one or more anchor ranging messages further comprise a ranging slot end (RSE) message sent at the end of the ranging slot time period; and during said calculating, clock skew between the serving anchor and the tag is corrected at the central authority by comparing the time difference between when the RSS and RSE were sent by the serving anchor and when the RSS and RSE were received by the tag.

In one embodiment, the serving anchor is selected by the tag from the plurality of anchors.

In one embodiment, the selection is made by the tag based on one or more of: a strongest signal criterion, a line-of-sight quality criterion, an earliest ranging slot time criterion, or a highest number of anchors participating in said ranging slot time period criterion.

In one embodiment, each anchor from said plurality of anchors chooses a corresponding ranging slot time period.

In one embodiment, the system is further configured to, before said transmitting: periodically send, by each anchor, a discovery message encoding a time delay between a sending time of the discovery message and a start time of the corresponding ranging slot time period of the anchor; and record, by each neighboring anchor in range of said anchor, said start time.

In one embodiment, each neighboring anchor is configured to, upon detecting that the corresponding ranging slot time period of the anchor collides with the corresponding ranging slot time period of that neighboring anchor, select a new corresponding ranging slot time period.

In one embodiment, the transceiver of the serving anchor is turned on at the start of said ranging slot time period and turned off after said ranging slot time period to conserve power.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

Figure 1:
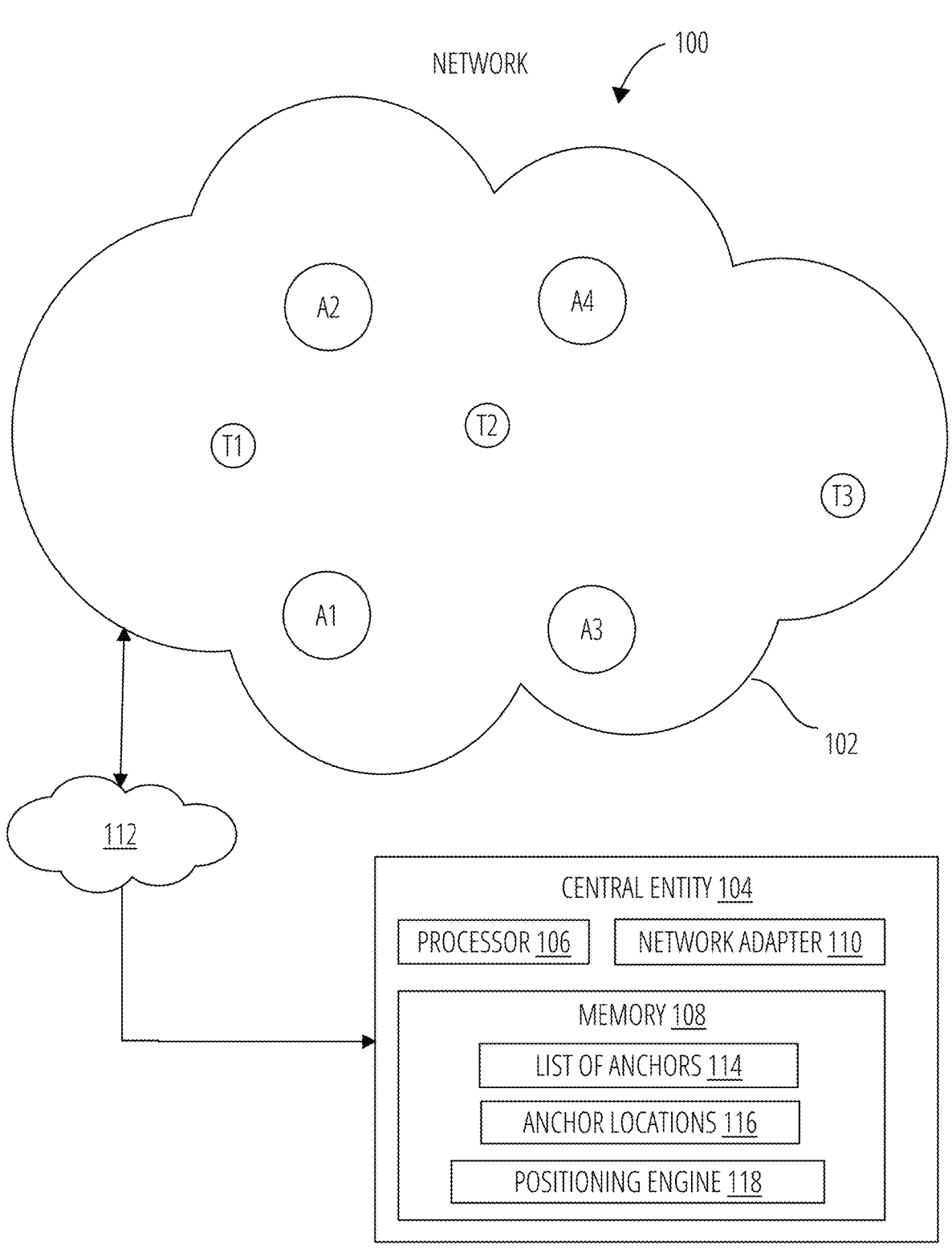
FIG. 1 is a schematic diagram of a positioning system for positioning a plurality of tags over a wireless network via a plurality of anchors, in accordance with embodiment.

Elements in the several drawings are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures, and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

In accordance with different embodiments, systems, and methods for positioning assets over a wireless network optimized for low-power (e.g., battery-powered) infrastructure devices are disclosed. These systems and methods provide the ability to position an asset with a wireless tag by exchanging a plurality of ranging messages between a serving anchor and a plurality of participating anchors. Advantageously, the tag is not required to send ranging messages itself, but rather listens to the messages exchanged between the serving anchor and the participating anchors in wireless range. Timing information or data of those messages recorded by the tag and the serving anchor are used to calculate the position of the tag. In addition, the systems and methods do not require all the devices in the network to be synchronized before a ranging event can be performed.

Figure 2:
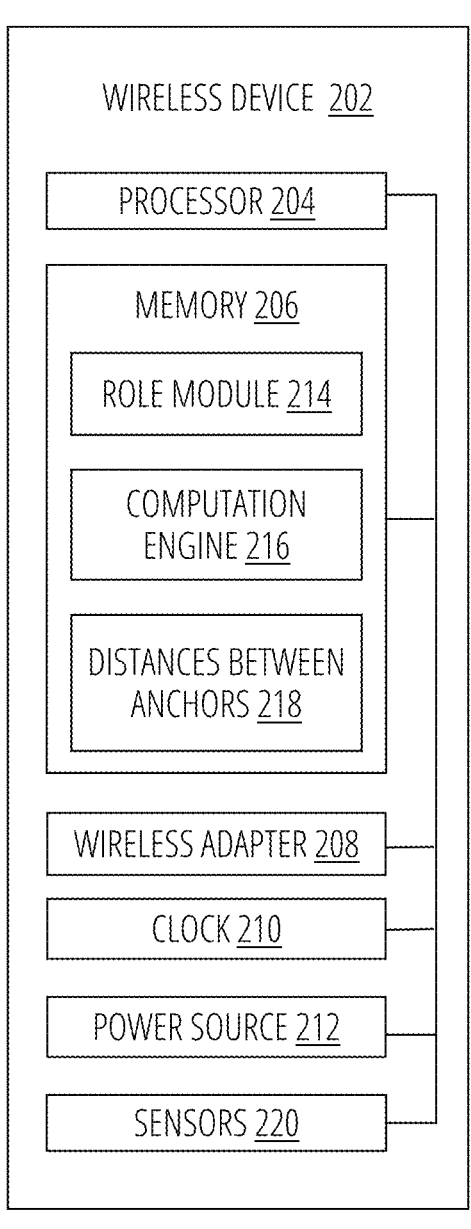
FIG. 2 is a schematic diagram illustrating a wireless device used as either an anchor or a tag in the system of FIG. 1, in accordance with one embodiment.

FIG. 1 shows a positioning system 100 comprising a plurality of tags (here three tags T1 to T3 shown as an example only) and anchors (anchors A1 to A4, again shown only as an example) wirelessly communicatively coupled in a ranging network 102. The terms "anchor" and "tag" refer each to a role assigned to a wireless device 202, such as the one schematically illustrated in FIG. 2. Each wireless device 202, whatever it's assigned role, comprises a processor 204 coupled to a memory 206 and a wireless network adapter 208. The wireless network adapter 208 includes a wireless transceiver operable to both transmit and receive wireless signals or messages to neighbouring devices via a plurality of wireless communication protocols/systems known in the art. These may include, for example, and without limitation: Bluetooth/BLE (Bluetooth Low Energy), WIFI, Ultra-Wide-Band (UWB), cellular or the like. Each wireless device 202 further has access to an internal clock 210, which is used to record timestamps of when different messages are sent and/or received. They also typically comprise an internal power source 212, in the form of a battery or the like, although the system 100 may function equally well with non-battery powered devices.

In some embodiments, the wireless device 202 may further comprise one or more sensors 220 operably coupled to processor 204. These may include, without limitation, motion sensors, temperature sensors, or any other type of sensors known in the art.

An "anchor" refers to a wireless device 202 which has a known fixed position, fixed at least for the duration of one or more ranging events, and as such its position can be used by other devices in the network as a reference while a "tag" is a wireless device 202 typically attached or positionally associated with an asset and its function is to keep track of the physical location of the asset within the network.

In some embodiments, memory 206 of the wireless device 202 may comprise a role module 214 comprising instructions necessary for the device 202 to perform the assigned role of a tag or anchor. In some embodiments, the role module 214 may be operable to switch between an anchor role or a tag role, or vice-versa, and/or it may also allow the wireless device 202 to perform both roles simultaneously. The switch between the anchor role and the tag role may be done based on any type of trigger, either externally generated outside of the wireless device 702, or generated from within the wireless device 202. In some embodiments, the triggers may be based on pre-defined conditions, user input, sensor input, detected network changes including a change in the detected neighbouring devices of the wireless device 202. In some embodiments, the role assignment for the wireless device 202 and any change thereto may be based, for example, on instructions received via the wireless network adapter 208.

In one non-limiting example, a wireless device 202 may be affixed to a truck/trailer or the like. When the truck approaches a loading bay, the wireless device 202 on the truck assumes the role of a tag and leads to a position with the on-site anchors. This way the system 100 establishes a position for the vehicle. Next when the truck is being loaded with tagged assets, the wireless device 202 on the vehicle assumes the role of an anchor to be used by the tags being loaded onto the truck to determine accurately when a tagged asset gets loaded.

In another non-limiting example, the wireless device 202 may be attached to a movable machine such as a medical scanner in a hospital. The device 202 can be configured to assume the role of a tag to estimate the position of the machine, but it can also be simultaneously configured to assume the role of an anchor to determine when a person carrying a tag comes close to the machine.

In addition, as will be made clear below, the system 100, in accordance with different embodiments, is configured to be most advantageously used with low-power devices. The anchors can be battery powered and last for years on a reasonably sized and economical battery. This is achieved through several improvements in the state of the art. However, the power-consumption reduction features it offers with respect to the prior art may also be advantageously used with non-battery powered devices as well. In some embodiments, a mix of battery-powered and non-battery powered devices may be used. The anchors and tags are able to transmit and receive signals or messages to neighbouring devices within wireless range, thus forming a network 102.

The system 100 further comprises a central entity (CE) 104, which is configured to do, at least in part, ranging calculations. In some embodiments, the central entity 104 may take the form of one or more servers located remotely, for example part of a Cloud-like infrastructure. Other embodiments, however, may have one of the devices (e.g., tags or anchors) configured to act, at least in part, as the CE 104. Typically, the CE 104 comprises one or more processors 106 operably coupled to a memory 108 and a network adapter 110. The network adapters 110 allows the CE 104 to receive messages from one or more devices directly or indirectly via one or more networks 112. The networks 112 may comprise any combination or wired or wireless networks, and include wide-area networks such as the internet. In some embodiments, the tag and anchors may use a different communication protocol to communicate with the central authority 104 (e.g., networks 112) than the one used to send and receive the wireless communications used for ranging and discovery described below (e.g., network 102). In addition, the CE 104 typically has stored in its memory 108 a list 114 of anchors comprised in system 100, and the anchor locations 116. In some embodiments, the location of the anchors may be stored in the form of a floorplan of the like. Central entity 104 further has stored in its memory a positioning engine 118 that comprises the instructions necessary to compute a position of each tag in accordance with the methods described below.

In some embodiments, the wireless device 202 (either acting as a tag or anchor or both) may also have in its memory 206 a computation engine 216 configured to perform at least some portion of the positioning computations. In some embodiments, these may be done using a list of distance between anchors 218, also stored in the memory 206.

In the state of the art "Time Difference of Arrival" (TDoA) systems, anchors are typically constantly in an active 'ON' state, and the maximum density of tags within an area the size of the wireless range (for example 20 m×20 m=400 m²) is limited by the chance of a collision between 2 tags transmitting at the same time. For example, in a system having 100 tags transmitting at 1 Hz where each message requires 1 ms of airtime, each message sent would have a roughly 5% chance of colliding with another message. These collisions seriously compromise the system effectiveness as the number of tags in the same radio environment increases.

In contrast, in a battery powered network, the anchors are typically duty cycled to reduce their power consumption. Taking the example above, in a 1 Hz system, the anchors might only be operating for 1% of that time, or 10 ms out of 1 second. Going back to the above example, 100 tags transmitting a message of 1 ms within the 10 ms duty cycle awake time frame of the anchor results in nearly all messages colliding, which is not compatible with practical use cases.

In contrast, the system 100 reverses the roles within a TDoA network. The anchors are configured to transmit messages, and the tags are configured to listen for these messages. This is called Reverse TDoA. In such a system, the above-mentioned limit to the number of tags (e.g., the tag density) within radio range disappears. This allows the system 100 to operate at much higher tag densities compared to known TDoA systems.

Eliminating Clock Synchronization

Within a typical TDoA based systems known in the art, anchors need to have a synchronized clock. This is typically achieved using either:

1. an atomic clock: such clocks have a very high degree of accuracy and can stay within the tolerance of the system for a long period of time. Such an atomic clock is expensive; or 2. a wireless synchronization scheme that must constantly synchronize the network at a rate faster than the time it takes for the local clock to shift outside of the allowed tolerance. This synchronization requires a lot of power and thus precludes battery operation. In addition, it often uses wireless airtime (e.g., bandwidth) to achieve such synchronization, thus reducing available airtime in the network for other purposes, such as positioning.

The Reverse TDoA method used by system 100, in accordance with difference embodiments, eliminates the requirement for clock synchronization by not only having the tag listen for the anchor signals but also having each anchor in wireless range listen to these same messages from other anchors. The mechanism of how this eliminates the expensive need for clock synchronization, is described below.

In some embodiments, the principles discussed above are implemented via two methods:

Discovery: determining the devices in wireless range of any particular device.

Ranging: determining the distance between an anchor and a tag.

Discovery

In system 100, each anchor is configured to operate within the network at a particular duty cycle, which is the cycle at which a new positioning or ranging event can be carried out by that anchor. As an example, we will assume the duty cycle to be 10$s$. Within that cycle the anchor will be in an active state for only a limited amount of time to save battery power. This active time will be referred to as the ranging slot of that anchor. In some embodiments, a ranging slot is chosen randomly by each anchor.

Discovery enables anchors and tags to detect which other anchors are within wireless range and what the timing of their respective ranging slots are. This is a prerequisite for the ranging mechanism discussed further below to work. In some embodiments, discovery is performed by having each anchor advertise on a regular or periodic basis, via a wireless discovery signal or message, to let other anchors and tags within wireless range know that they are 'here' or active in the network. This message may be transmitted frequently, (for example at 4 Hz in a non-limiting example), such that any device on the network that wants to discover the nearby devices can simply listen for a short period of time and discover all the Anchors that are nearby. This discovery message is based on the time clock of each device. In some embodiments, the discovery message may contain:

1. the source address of the device;
2. the destination address, set to broadcast; and
3. an indication, in ticks (e.g., pre-defined time period which is used as the resolution of time within the network), of when the ranging slot is planned to occur relative to the time the discovery signal was sent.

Each anchor is also responsible to, periodically, scan for discovery signals or messages from neighbouring anchors in wireless range in the network. The anchor will then keep in its memory a database of the neighbouring anchors it has along with an offset, referenced to its clock, of when the ranging slot of each neighbouring anchor is planned to occur.

If a collision occurs between ranging slots of neighbouring anchors, then the anchor will select a new ranging slot. For example, if an anchor notices ranging signals or messages coming from another anchor unrelated to its own ranging slot, then the anchor establishes the fact that its ranging slot has collided with that of another Anchor. The Anchor may randomly or according to another decision mechanism choose another slot, and the process continues until no collision with another anchor's ranging slot occurs. However, two anchors can hold ranging slots that overlap with each other as long as they are out of radio range.

Ranging

During ranging, the tags do not transmit any ranging-related messages per se, as opposed to a traditional TDoA system. Instead, each tag selects its "ideal" anchor(s) as serving anchors. A serving anchor is an anchor who's ranging slot the tag will listen to.

In some embodiments, the anchor which will act as a serving anchor for a tag may be determined by the tag based on one or several combined criteria such as received signal strength, line-of-sight quality, number of neighbor Anchors, time to the Anchor's ranging slot and other.

Strongest Signal: In this method the tag looks at the messages transmitted by all the anchors and selects the anchor that has the highest signal strength. Selecting the closest anchor has the advantage that the ranging operation has an improved chance of running to completion successfully without being compromised by errors in the wireless transmission.

Line-of-sight quality: In this method the tag looks at a parameter which is sometimes available in wireless transmission that expressed how clear the line-of-sight of the transmission was (i.e., how unobstructed by objects). Selecting this anchor also has the advantage that the ranging operation has an improved chance of running to completion successfully without being compromised by errors in the wireless transmission.

Highest number of Anchors participating in the exchange: In this method, the tag will select the Anchor, for which, in the ranging slot, the Tag receives the highest number of Anchors. This strategy ensures the tag has a high number of anchor's that may be used for (reverse) TDoA calculations by the central entity 104.

Earliest Ranging Slot: In this method the Tag selects the Anchor that will be operating its ranging slot first. This strategy is ideal in applications where the Tag is moving at a high speed and thus this method ensures that the Tag does not move far away from the Anchor.

In some embodiments, if a tag elects a particular anchor as a serving anchor, it can choose to switch to another anchor's ranging slot if it determines that the quality of this anchor is not sufficient.

Once the tag (e.g., for example tag T1 in FIG. 3A to FIG. 3D for example) has selected its serving Anchor(s) (e.g., A1 in the same figures) it enables its receiver during these anchor(s)' ranging slot. Once a tag has selected an anchor as a serving anchor, and once the neighbouring anchors are aware of the serving anchors' ranging slot, ranging may be performed by having the tag listen to messages exchanged by the serving anchor and neighbouring anchors, as will be described below.

In addition, the transceivers in each anchor and tag is coupled to a high-speed clock with a certain resolution, for example 15 ps, meaning the clock ticks every 15 ps in this example. When a message is received the transceiver records both the message contents and the time of reception with a resolution of 15 ps.

Figures 3A, 3B:
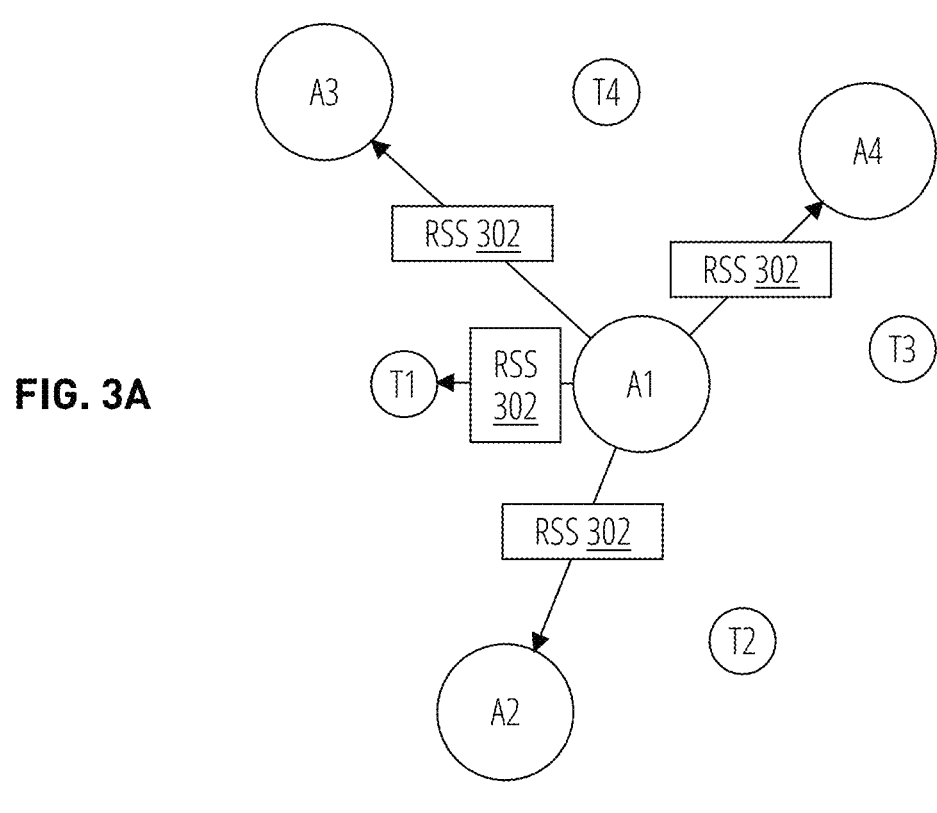
FIG. 3A to 3D are schematic diagrams illustrating an exemplary ranging event performed by the system of FIG. 1., in accordance with one embodiment.
Figure 3C:
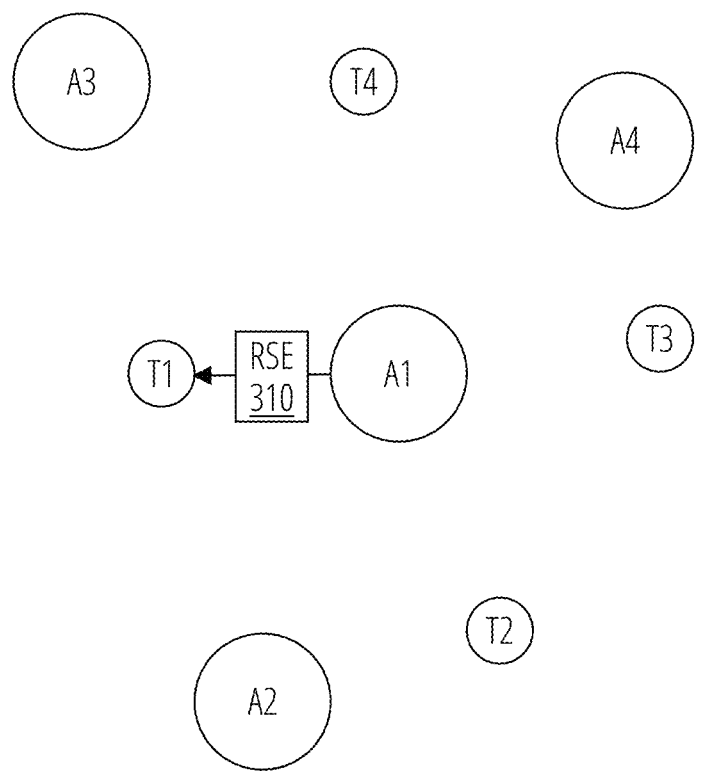

At the start of its ranging slot, A1 enables its transceiver and transmits a wireless Ranging Slot Start (RSS) message 302 to indicate the start of its ranging slot. The RSS message 302 is received by each neighbouring anchor (e.g., A2, A3 and A4) and tag which uses anchor A1 as its serving anchor (e.g., tag T1 here), as illustrated in FIG. 3A. The RSS message may contain, for example:

1. the source address of the anchor; and
2. the destination address, set to broadcast.

Every neighboring anchor in wireless range (e.g., anchors A2, A3 and A4 in FIGS. 3A to 3D), hereinafter referred to as participating anchors because they participate in the ranging event, during the anchor A1's ranging slot, then transmits a message called a Ranging Slot Timing (RST) messages (e.g., RST messages 304, 306 and 308 in FIG. 3B). In some embodiments, The RST message may include:

1. the source address of the participating anchor; and
2. the destination address, set to the address of the anchor which is the owner of the ranging slot (e.g., anchor A1).

In some embodiments, the participating anchors may each select a corresponding random time within the serving anchor's ranging slot to transmit the RST message, although other scheduling configurations may be considered as well.

The anchor A1 has its receiver enabled during the entire duration of its ranging slot, and stores or records timing data of the incoming RST messages received from the participating anchors A2, A3 and A4. The tag T1 also receives each RST message and similarly records timing data related thereto.

In some embodiments, at the end of its ranging slot, anchor A1 further transmits a Ranging Slot End (RSE) message (e.g., message 310 if FIG. 3C) to indicate the end of its ranging slot which is received by the tag T1. The RSE message may be used to correct clock skew between devices, which increases positioning accuracy, as will be further discussed below. In some embodiments, the RSE message may contain:

1. the source address of the anchor; and
2. the destination address, set to broadcast.

Figure 4:
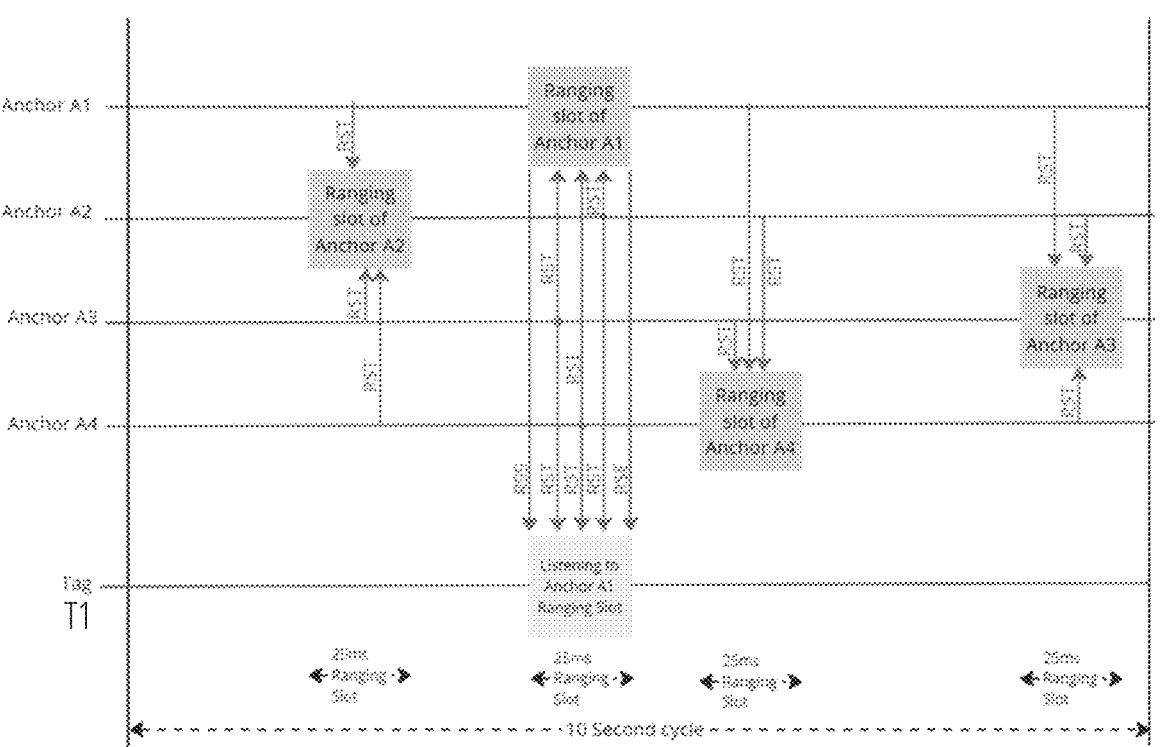
FIG. 4 is a schematic diagram illustrating an exemplary timing of the exemplary ranging event of FIGS. 3A to 3D, in accordance with one embodiment.

An exemplary schematic diagram illustrating the ranging between the four anchors A1-A4 and the tag T1, each anchor having a different ranging slot and the messages that are exchanged therebetween is shown in FIG. 4. In this example, each ranging slot is 25 ms long, and the vertical arrows illustrate the messages that are sent from one device and received by another device. The process discussed above may be repeated every cycle (i.e., every 10 seconds in the example of FIG. 4). The skilled person in the art will appreciate that other cycle durations may be considered as well.

In some embodiments, during the duration of its ranging slot, an anchor will ignore any discovery message it receives. In addition, if it receives any RSS or RSE message from another anchor, or if it receives a RST message from a neighbouring anchor having a destination address that does not match the anchor's own address, it means the ranging slot has probably collided with another Anchor's slot. In such a case, the anchor shall stop listening and find another time for its slot. In some embodiments, this new time may be selected at random within the serving anchor's ranging time.

Figure 3D:
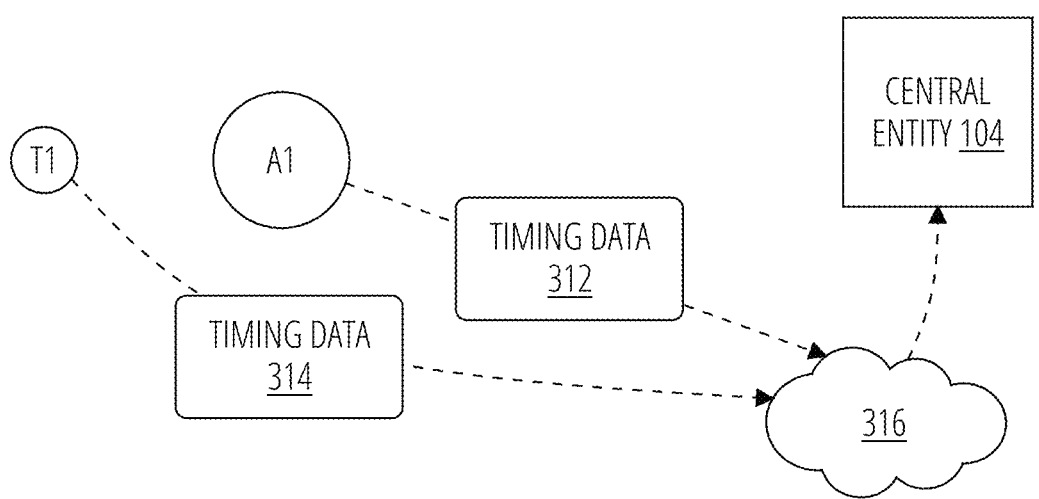

At the end of its ranging slot and as illustrated in FIG. 3D, the anchor A1 transmits to the central entity 104 timing data 312 comprising timestamps of when it transmitted the RSS and optionally RSE messages, and of when it received each RST message from each other participating anchor during its ranging slot. Similarly, the tag T1 sends timing data 314 to the central entity 104 comprising timestamps of when it received each RSS, optionally RSE and RST message. This information is transmitted via data transmission mechanisms that are out-of-scope of the present disclosure and can rely on method known by the skilled person in the art. In the illustrated example, the transmission may be done, at least in part, via wide-area network 316 like the internet. In some embodiments, the data transmission may be done via one or more hubs, gateways, switches or such intermediary devices, and may include one or more coupled networks. The networks may be wired, wireless or any combination thereof.

In some embodiments, each anchor's receiver is disabled throughout the rest of the time (e.g., outside ranging slots and discovery slots).

In some embodiments, all the positioning computations may be performed on the central entity 104. Thus, upon the central entity 104 having received the timing data 312 from the serving anchor A1 and the timing data 314 from the tag T1, it can compute a position of T1 and of the asset it is positionally associated to. In some embodiments, this is done by:

1. determining a time difference of departure (TDoD) of each RST message received by the serving anchor, which may be done because the distance between any 2 anchors is known by the central entity 104 from the locations where the anchors have been installed, and thus the travel time between any 2 anchors may be calculated;
2. calculating a time difference of arrival (TDoA) of the RST messages sent from each participating anchor received by the tag;
3. computing, from the TDoD and TDoA, a time difference of flight (TDoF); and
4. computing, from the TDoF, the tag position.

In some embodiments, the TDoD may be computed from the timing data 312. As noted above, the central entity 104 receives from serving anchor A1 all the arrival times of the RST messages from other the other participating Anchors. These arrival times are measured by serving anchor A1 and are thus relative to Anchor A1's clock which may be arbitrarily assumed to start at the start of the ranging slot. The central entity 104 knows the distance between Anchor A1 and each participating anchor A2, A3 and A4 (via the anchor locations 116), and can derive the time it took each ranging slot timing message to travel from the transmitting anchor to anchor A1. The travel time is subtracted from the reception time at Anchor A1 to calculate the departure transmission time of the message from each neighboring anchor. These departure times are referenced to A1's own clock. Note that the choice of the reference time's starting point is arbitrary as only the time differences are important.

In some embodiments, the TDoA may be computed using timing data 314 from the arrival times at which the messages from all participating anchors were received by the tag. Again the choice of the reference time's starting point is arbitrary as only time differences are important.

The central entity 104 proceeds to subtract the TDoD (as calculated above) of each of the participating anchors from the TDoA at the tag for each Anchor. The resulting quantities are the sum of the distance (expressed in time units) between the tag (T1) and anchor A1 and the distance (in time units) between the tag T1 and each neighboring anchor (A2, A3 and A4). At this point the CE has the TDoA information required to estimate the position of the Tag within the 2D/3D space using the positioning engine 118. The system of equations obtained can be solved for the actual distance between the tag and each anchor.

In some embodiments, the positioning computations described above may be performed on two or more devices of system 100. Therefore, in some cases, step 1 above (TDoD calculation) may be performed on the serving anchor or another anchor via the computation engine 216 and the list of distances between anchors 218. The resulting TDoD of each RST message may then be transmitted to the central authority 104 where steps 2-4 may be performed. Moreover, the skilled person in the art will appreciate that the steps 1-4 may be split further into sub-steps, and that these steps or sub-steps may be performed, at least in part, alone or in combination, on different devices of system 100 (anchor, tag, and/or central entity), as a function of their computational capabilities and/or power requirements.

Clock Skew Between Serving Anchor and Tag

The anchors transmit both a RSS message and a RSE message during their ranging slot. The time difference from the RSS to the RSE is transmitted to or known by the central entity 104. The tag receives both the RSS and the RSE and also transmits the time difference between them to the central entity 104. If the anchor's clock and the tag's clock are running at the same speed, then the measured differences will be exactly the same. But due to the nature of how clocks are built, they will not run at the same speeds and one will be running slower than the other, thus generating clock skew.

In some embodiments, the central entity 104, by subtracting one time difference from the other, can calculate how much the clocks speeds differ from one another. This information is then used by the central entity 104 when it calculates the TDoA for the tag. The central entity 104 effectively corrects the time differences calculated as per the method above by the calculated clock skew. The result of this clock skew compensation is an increase in timing accuracy and thus an increase in distance estimation and thus an increase in positioning accuracy.

In some embodiments, the clock skew correction may be performed at the cloud level by the central entity, by comparing the time difference between RSS and RSE as reported by the serving anchor with the same time difference as measured by the Tag. These signals provide us with a reference for the Serving Anchor.

As an example, assume the following:

A1 (the serving anchor)

RSS is transmitted at time 100 of A1's clock.

RSE is transmitted at time 200 of A1's clock.

The central entity 104 can thus calculate that A1's clock is incremented 100 cycles between sending RSS and RSE messages.

The central entity analyzes the time the RSS and the RSE messages were received by the tag T1. For example, assuming that:

the RSS is received at time 300 of T1's clock; and the RSE is received at time 410 of T1's clock.

This means T1's clock incremented by 110 cycles between receiving the RSS and the RSE from A1. Thus, in this example, T1's clock is running 10% faster than A1. The central entity 104 therefore knows that each timestamp it receives from T1 needs to be adjusted by −10% to match A1's clock with reference to the RSS. As an additional example, this correction may be performed in the following manner:

Assume T1 receives an RSS from A1 when its clock is 300.

Assume T1 receives an RST from A2 when its clock is 340.

The central entity knows that T1's clock is running at 10% faster than A1's clock. Therefore, the central entity 104 can compensate by removing 10% out of the time from when the RSS of A1 was received at T1 and the RST of A2 was received at T1.

Thus, 340−300=40, which when reduced by 10% equals 36.36. The central entity 104 may use 36.36 as the time T1 received A2's RST message as would have been perceived by A1's clock.

In some embodiments, the skew correction is recalculated for every ranging slot. In some embodiments, other methods of correction may be used, as will be known to the skilled person in the art. In one example, a moving average of the clock skew may be used instead of performing a single measurement based calculation.

In some embodiments, during the ranging slot interaction, there is a need to correct the clock skew between the serving anchor and the tag. Typically, it may not be required to correct the clock skew of participating anchors because it's only the serving anchor's clock that comes into play in the calculations. Indeed, the other anchor's clocks and any clock skew with (in the example above) anchor A1 is irrelevant.

Time Clock Anchors

In some embodiments, because anchors need to transmit RST messages during their neighbor's ranging slot, anchors need to correct or factor the time clock-skew with respect to their neighboring anchors.

In some embodiments, this may be done by:

1. having the anchors transmit their discovery messages, accurately, based on the determined frequency; and 2. having the neighbouring anchors run the discovering listening window two times such that they can calibrate the skew between their clock and the neighbour's. The skew may then be factored when transmitting the RST messages.

In some embodiments, the anchors may also periodically run a discovery window to re-correct the skew that might vary by time and conditions.

Time Clock: Tags

In some embodiments, Tags may keep in sync with the serving anchor when they are actively listening in to the anchor's ranging slot, however, if the tag simply requires keeping track of its neighbouring anchors (e.g. while stationary), the tag may use the same technique outlined for the anchors above.

Figure 5:
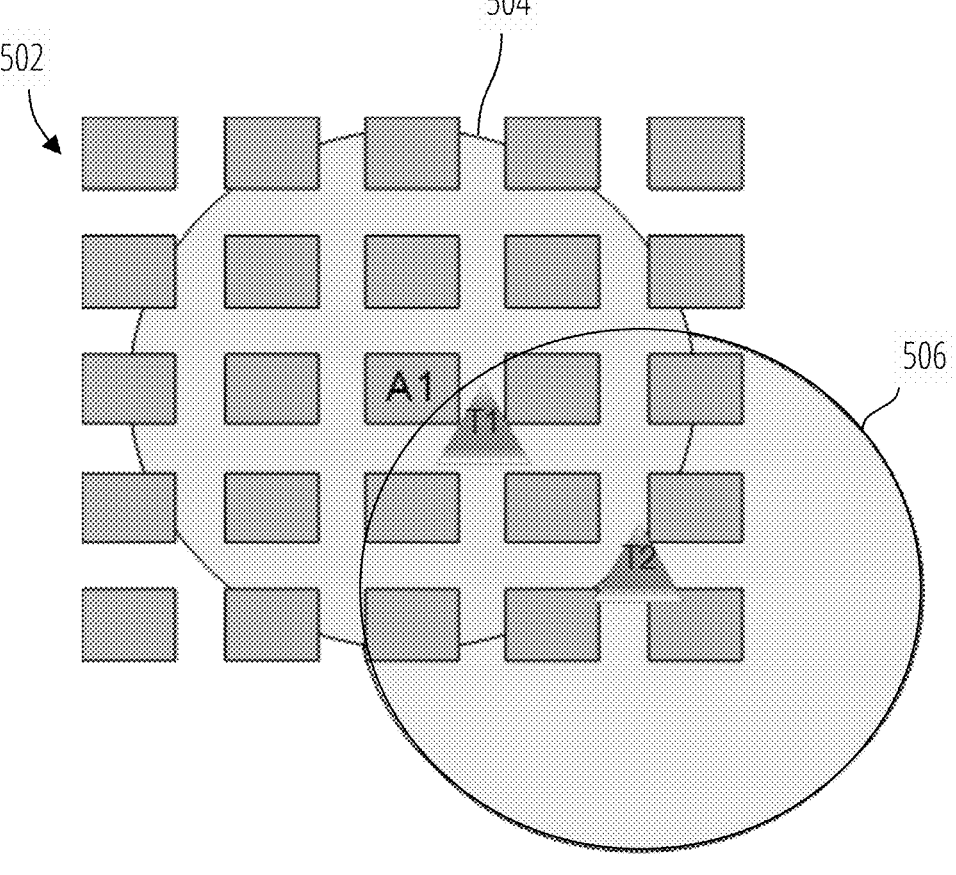
FIG. 5 is schematic diagram illustrating how a tag selects its serving anchor, in accordance with one embodiment.

FIG. 5 illustrates another exemplary network of anchors 502 similar to system 100 physically distributed on a 5×5 grid. In this example, the anchor A1 is located in the middle of the network 502. The tag T1 is close to anchor A1 and it correctly establishes that A1 is the closest anchor. The tag T2 is relatively far away from anchor A1, however it incorrectly establishes that A1 is the closest Anchor. The circle 504 indicates the radio range of anchor A1. All the anchors falling within the circle 504 will participate in the ranging Slot of anchor A1. Since tag T1 is close to anchor A1, T1's radio coverage is similar to A1 and thus it will probably receive the RST messages from all the anchors within the circle 504. T2's range is outlined with the circle 506. T2 will only get a subset of the RST messages to A1 since it does not have radio coverage to all the Anchors participating in anchor A1's Ranging Slot; it can only see (for example) 8 of A1's neighbouring anchors.

Figure 6A:
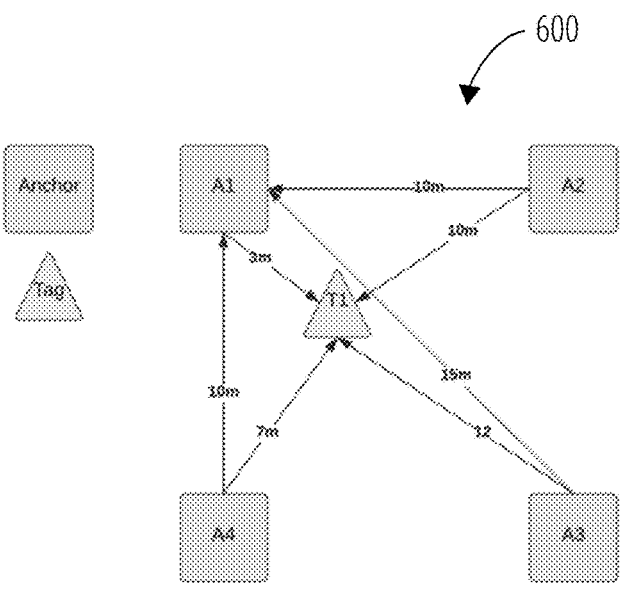
FIG. 6A, FIG. 6B and FIG. 6C are schematic diagrams illustrating another configuration of the positioning system of FIG. 1 (FIG. 6A) and of the discovery process (FIG. 6B) and ranging process (FIG. 6C) used thereby, in accordance with one embodiment.
Figure 6B:
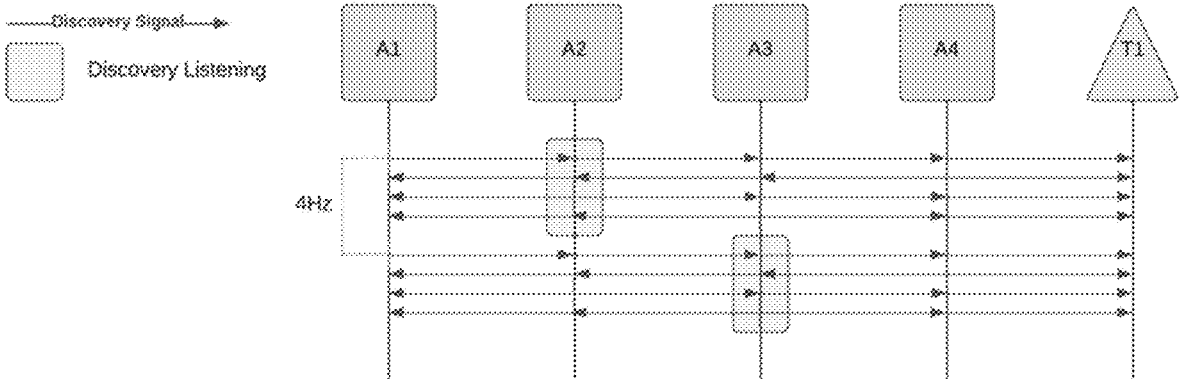
Figure 6C:
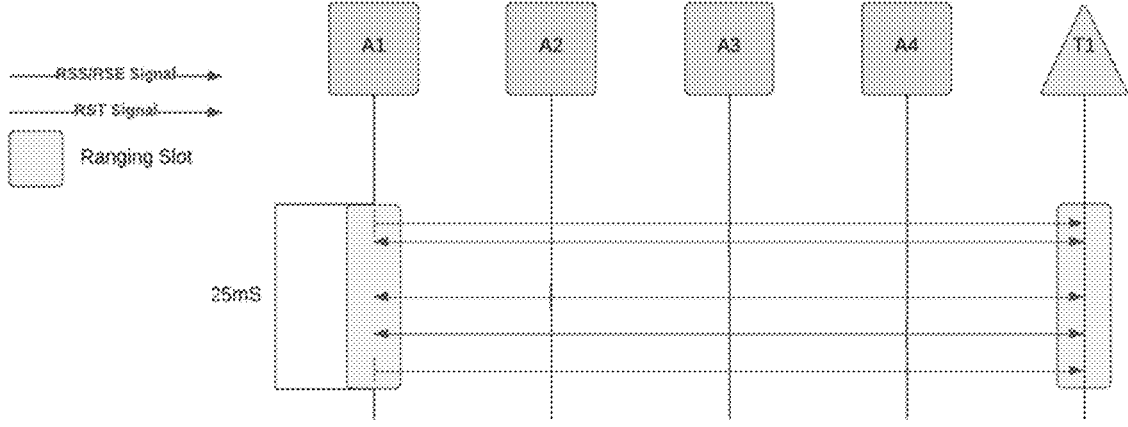

With reference to FIG. 6A, FIG. 6B and FIG. 6C, another non-limiting example of the discovery and ranging protocols or methods will be discussed, in accordance with one embodiment. This example will use exemplary values and the skilled person in the art will appreciate that this example is illustrative only.

In this example, 4 anchors and one tag are shown. Anchors A1 to A4 are installed on a 10 m grid or array 600. FIG. 6A illustrates the relative location of each device, while FIG. 6B and FIG. 6C illustrate the timing of the communications between each device during the discovery period and the ranging period, respectively. In some embodiments, for such a system, the following characteristics may apply.

All the anchors are transmitting the discovery message at 4 Hz.

Each Anchor is responsible to, periodically, run a Discovery Listening period. This way the Anchor is aware of which neighboring anchors are active near it.

Since, in this example, the discovery message is broadcast at 4 Hz, the Discovery Listening Period may be larger than 250 mS.

In FIG. 6B, A2 and A3 are illustrated listening for discovery messages period for all neighboring anchors.

FIG. 6C illustrates how the ranging protocol is performed by the same exemplary setup shown in FIG. 6A and FIG. 6B. In FIG. 6C, anchor A1 is running its ranging slot and tag T1 has selected anchor A1 as its serving anchor. Then:

1. anchor A1 starts the interaction by sending out the RSS message. This message is received by T1.
2. Next anchor A3 sends out and RST message.
3. Next anchor A2 sends out an RST message.
4. Next anchor A4 sends out an RST message.
5. Finally A1 finishes the interaction by sending an RSE message indicating the ranging slot has finished.

Timing Data Collection at the Serving Anchor and at the Tag During the Ranging, Slot.

For the purpose of the example of FIG. 6A, FIG. 6B and FIG. 6C only, it is assumed that the messages/signals travel at 1 m/s and the UWB clocks of all the devices are running at 1 Hz. Table 1 below illustrates an exemplary sequence of actions taken by the tag T1 and its ranging anchor A1. The relative order in which these actions happened is given as an example only. Furthermore, it is assumed that the clocks in each device run at a same speed. Correction for clock skew between devices will be discussed further below.

b. A1 receives the A3's RST when its time is 19. A1 stores this as [RST(A3)=19].
3. A2 transmits RST when the clock of A1 is 7.
   a. T1 and A1 both receive A2's RST at the same time because they are both 10 m away.
      i. T1 stores it as [RST(A2)=47].
      ii. A1 stores it as [RST(A2)=17].
4. A4 transmits RST when the clock of A1 is 11.
   a. T1 receives the A4's RST when its time is 48. T1 stores this as [RST(A4)=48].
   b. A4 receives the A4's RST when its time is 21. A1 stores this as [RST(A4)=21].
5. A1 transmits the RSE message when its time is 24 and stores it in its memory as [RSE=24].
   a. T1 receives RSE when its time is 57. T1 stores it as [RSE(A1)=57].

After this transaction both the anchor A1 and the tag T1 send the contents of their memory to the central entity (e.g., on the cloud) using the WP network, for example.

Processing the Timing Data to Distances at the Central Entity

TABLE 1

| | Time A1 | Time T1 | Interaction | A1 Memory | T1 Memory |
|---|---|---|---|---|---|
| | 0 | 30 | | | |
| 5% | 1 | 31 | | | |
| reserved | 2 | 32 | A1 transmits RSS and stores the timestamp at which RSS was transmitted | RSS = 2 | |
| for RSS | | | | | |
| | 3 | 33 | | | |
| 90% | 4 | 34 | A3 transmits RST | | |
| reserved | 5 | 35 | T1 receives RSS | | RSS(A1) = 35 |
| for RSTs | 6 | 36 | | | |
| | 7 | 37 | A2 transmits RST | | |
| | 8 | 38 | | | |
| | 9 | 39 | | | |
| | 10 | 40 | | | |
| | 11 | 41 | | | |
| | 12 | 42 | | | |
| | 13 | 43 | | | |
| | 14 | 44 | | | |
| | 15 | 45 | | | |
| | 16 | 46 | T1 receives RST from A3 | | RST(A3) = 46 |
| | 17 | 47 | A1 and T1 receive A2's RST | RST(A1) = 17 | RST(A2) = 47 |
| | 18 | 48 | T1 receives A4's RST | | RST(A4) = 48 |
| | 19 | 49 | A1 receives A3's RST | RST(A3) = 19 | |
| | 20 | 50 | | | |
| | 21 | 51 | A1 receives A4's RST | RST(A4) = 21 | |
| | 22 | 52 | | | |
| 5% | 23 | 53 | | | |
| reserved | 24 | 54 | A1 transmits RSE and stores the timestamp at which RSE was transmitted | RSE = 24 | |
| for RSE | | | | | |
| | 25 | 55 | | | |
| | 26 | 56 | | | |
| | 27 | 57 | T1 receives RSE | | RSE(A1) = 57 |

Table 1 above show the following sequence of events/ actions:

1. The process starts with A1 transmitting a RSS when the clock of A1 is equal to 2.
   a. T1 has selected A1 as its Serving Anchor thus it is also listening through this Ranging Slot. In this example, T1 is 3 meters away from A1 and it will receive RSS when its time is 35. Thus it keeps a record in its Memory [RSS(A1)=35].
2. A3 transmits RST when the clock of A1 is 4.
   a. T1 receives the A3's RST when its time is 46. T1 stores this as [RST(A3)=46].

The central entity receives the following timing data from each device:

TABLE 2

| Anchor A1 memory timing data (a) | Tag T1 memory timing data (b) |
|---|---|
| RSS(A1) = 2 | RSS(A1) = 35 |
| RST(A2) = 17 | RST(A3) = 46 |
| RST(A3) = 19 | RST(A2) = 47 |
| RST(A4) = 21 | RST(A4) = 48 |
| RSE(A1) = 24 | RSE(A1) = 57 |

In addition, the central entity has in its memory a table listing the distances between the anchors in the system. For the current example:

TABLE 3

| Anchor | Distance to A1 | Time of Flight to A1 (c) |
|---|---|---|
| A2 | 10 m | 10 time units |
| A3 | 15 m | 15 time units |
| A4 | 10 m | 10 time units |

In some embodiments, first the central entity (e.g., cloud system or other) establishes when each of the RST messages was actually transmitted in reference to A1's clock, by subtracting the Time of Flight (c) to A1 from the arrival time at A1 (a):

1. RSS is the reference. In this example, this was transmitted at time 2.
2. A2's RST was received at A1 at time 17. The central entity knows that A2 is 10 m away from A1 thus it calculates that it was transmitted from A2 at time 7.
3. A3's RST was received at A1 at time 19. The central entity knows that A3 is 15 m away from A1 thus it calculates that it was transmitted from A3 at time 4.
4. A4's RST was received at A1 at time 21. The central entity knows that A4 is 10 m away from A1 thus it calculates that it was transmitted at time 11.
5. RSE was transmitted at time 24.

These RST transmission times on A1's clock are shown as (d) in the table 4 below. At this stage the central entity may establish a Time Difference of Departure (TDoD) in reference to A1's clock TDoD(A1) by subtracting A1's RSS time from the message departure time on A1's clock.

TABLE 4

| Message | Departure on A1's clock (d) | Time Difference of Departure compared to time RSS of A1 was sent – TDoD(A1) (e) = (d) – 2 (e.g., reference time in this example) |
|---|---|---|
| RSS(A1) | 2 | 0 |
| RST(A2) | 7 | +5 |
| RST(A3) | 4 | +2 |
| RST(A4) | 11 | +9 |
| RSE(A1) | 24 | +22 |

Using the information from Tag T1 we can establish the Time Difference of Arrival (TDoA) of the RST messages at (e.g., T1 TDoA(T1)) by subtracting the arrival times from the reference time at which the RSS was received by T1 (e.g., 35 on T1's clock). The results are listed in table 5 below.

TABLE 5

| Message | Arrival on T1's clock (b) | TDoA at T1 (e.g., TDoA(T1)) (f) = (b) – 35 |
|---|---|---|
| RSS(A1) | 35 | 0 |
| RST(A2) | 47 | +12 |
| RST(A3) | 46 | +11 |
| RST(A4) | 48 | +13 |
| RSE(A1) | 57 | +22 |

The central entity can compute how much longer it took the RST message to arrive at tag T1 compared to the time it took for the RSS of A1 to arrive at T1. This is called the Time Difference of Flight (DToF(g)). The results are shown in table 6 below.

TABLE 6

| Message | TDoD(A1) (e) | TDoA(T1) (f) | TDOF (g) = (f) – (e) |
|---|---|---|---|
| RSS(A1) | 0 | 0 | 0 |
| RST(A2) | +5 | +12 | +7 |
| RST(A3) | +2 | +11 | +9 |
| RST(A4) | +9 | +13 | +4 |
| RSE(A1) | +22 | +22 | |

Note above that the RSE is not required for this calculation, it is instead typically used for clock skew correction. These TDoF are now translated into a distance difference by using the speed of flight, here assumed for simplicity of explanation only to be 1 meter per time unit. In the table 7 below the unknown distance between A1 and T1 is represented by X.

TABLE 7

| Anchor | TDoF (g) | Distance Difference from T1 to Anchors compared to distance to A1 (h) | Distance from T1 to Anchor (i) = X + (h) |
|---|---|---|---|
| A1 | 0 | 0 | X |
| A2 | +7 | +7 | X + 7 |
| A3 | +9 | +9 | X + 9 |
| A4 | +4 | +4 | X + 4 |

Distance of Positions

The calculated distances differences (h) in table 7 are fed to the positioning engine (e.g., positioning engine 118) of the central entity to calculate positions (e.g., that X=3 m).

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

Any of the methods, algorithms, implementations, or procedures described herein can include machine readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a hard drive, or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions depicted herein can be implemented manually as opposed to automatically by a controller, processor, or similar computing device or machine.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Information as herein shown and described in detail is fully capable of attaining the above-described object of the present disclosure, the presently preferred embodiment of the present disclosure, and is, thus, representative of the subject matter which is broadly contemplated by the present disclosure.

What is claimed is:

1. A computer-implemented method for positioning an asset, comprising the steps of:

transmitting, by a serving anchor selected from a plurality of anchors having designated locations, during a ranging slot time period of said serving anchor, a ranging slot start (RSS) message to be received only by a tag positionally associated with said asset;

transmitting, by one or more participating anchors of said plurality of anchors in range of said serving anchor, each at a randomly determined time during said ranging slot time period of said serving anchor, a return-ranging slot timing (RST) message to be received only by the serving anchor and the tag;

recording, by the serving anchor, a first timing data of when said ranging slot start message was sent and when said RST messages are each received by the serving anchor from each participating anchor;

recording, by said tag, during said ranging slot time period of the serving anchor, a second timing data of when said RSS message and each RST message is received by the tag; and estimating, from said first timing data and said second timing data, either by a central entity communicatively coupled to said tag and said serving anchor via a network, alone, or by a combination of the serving anchor and central entity, from said first timing data and said second timing data, a position of the tag.

2. The computer-implemented method of claim 1, wherein said estimating is done, at least in part by:

determining a time difference of departure (TDoD) of each RST message received by the serving anchor, and a time difference of arrival (TdoA) of each RST message received by the tag;

calculating a time difference of flight (TdoF) from said TdoD and TdoA;

computing said position of the tag via said TdoF; and wherein said determining said TDoD comprises, for each RST message:

deriving a travel time between the participating anchor that transmitted the ranging slot timing message and the serving anchor; and calculating a departure transmission time of the RST message by subtracting the travel time from a reception time of the RST message at the serving anchor.

3. The computer-implemented method of claim 2, wherein said determining of said TDOD further comprises subtracting from said departure transmission time of said RST message a time of transmission of said ranging slot start message.

4. The computer-implemented method of claim 3, wherein said serving anchor further sends a ranging slot end (RSE) message at the end of the ranging slot time period of the serving anchor; and wherein, during said calculating, clock skew between the serving anchor and the tag is corrected at the central authority by comparing a time difference between when the RSS message and RSE message were each sent by the serving anchor and when the RSS and RSE were each received by the tag.

5. The computer-implemented method of claim 1, wherein, before said transmitting the RSS message by the serving anchor, said serving anchor is selected by the tag from the plurality of anchors.

6. The computer-implemented method of claim 5, wherein said selection is made by the tag based on one or more of: a strongest signal criterion, a line-of-sight quality criterion, an earliest ranging slot time criterion, or a highest number of anchors participating in said ranging slot time period criterion.

7. The computer-implemented method of claim 1, wherein each anchor from said plurality of anchors randomly chooses a corresponding ranging slot time period.

8. The computer-implemented method of claim 7, further comprising the step of, before said transmitting:

periodically sending, by each anchor, a discovery message encoding a time delay between a sending time of the discovery message and a start time of the corresponding ranging slot time period of the anchor;

recording, by each neighboring anchor in range of said anchor, said start time.

9. The computer-implemented method of claim 8, wherein, upon the anchor detecting that the corresponding ranging slot time period of the anchor collides with the corresponding ranging slot time period of the neighboring anchor, randomly selecting, by the anchor, a new corresponding ranging slot time period.

10. The computer-implemented method of claim 1, wherein a transceiver of the serving anchor is turned on at the start of said ranging slot time period and turned off after said ranging slot time period to conserve power.

11. A system for positioning an asset, comprising:

a tag positionally associated with the asset and a plurality of anchors each having a designated location, said tag and said anchors each comprising a processor operatively coupled to a memory and a transceiver; and wherein a serving anchor selected from said plurality of anchors is configured to transmit during a ranging slot time period of said serving anchor, a ranging slot start (RSS) message to be received only by the tag;

wherein one or more participating anchors in range of said serving anchor are configured to each at a randomly determined time during said ranging slot time period of said ranging anchor send a ranging slot timing (RST) message to be received only by the serving anchor and the tag;

wherein the serving anchor is further configured to record in the memory of said serving anchor a first timing data of when said RSS message was sent and when said RST messages are each received by the serving anchor from each participating anchor;

wherein said tag is further configured to record in the memory of the tag, during said ranging slot time period, a second timing data of when RSS message and each RST message is received by the tag;

the system further comprising a central entity communicatively coupled to said tag and said serving anchor via a network; and wherein either the central entity alone or a combination of the serving anchor and central entity are further configured to estimate, from said first timing data and said second timing data, a position of the tag.

12. The system of claim 11, wherein said estimating is done, at least in part, by:

determining a time difference of departure (TdoD) of each RST message received by the serving anchor, and a time difference of arrival (TdoA) of the RST messages from each participating anchor received by the tag;

calculating a time difference of flight (TdoF) from said TdoD and TdoA;

computing said position of the tag via said TdoF; and wherein said determining a TDoD comprises, for each RST message:

deriving a travel time between the participating anchor that transmitted the RST message and the serving anchor; and calculating a departure transmission time of the RST message by subtracting the travel time from a reception time of the RST message at the serving anchor.

13. The system of claim 12, wherein determining of said time difference of departure further comprises substracting from said departure transmission time of said RST message a time of transmission of said RST message.

14. The system of claim 13, wherein said serving anchor further sends a ranging slot end (RSE) message at the end of the ranging slot time period of the serving anchor; and wherein, during said calculating, clock skew between the serving anchor and the tag is corrected at the central authority by comparing a time difference between when the RSS message and RSE message were each sent by the serving anchor and when the RSS and RSE messages were each received by the tag.

15. The system of claim 11, wherein, before said transmitting the ranging slot start message by the serving anchor, said serving anchor is selected by the tag from the plurality of anchors.

16. The system of claim 15, wherein said selection is made by the tag based on one or more of: a strongest signal criterion, a line-of-sight quality criterion, an earliest ranging slot time criterion, or a highest number of anchors participating in said ranging slot time period criterion.

17. The system of claim 11, wherein each anchor from said plurality of anchors randomly chooses a corresponding ranging slot time period.

18. The system of claim 17, wherein the system is further configured to, before said transmitting:

periodically send, by each anchor, a discovery message encoding a time delay between a sending time of the discovery message and a start time of the corresponding ranging slot time period of the anchor; and record, by each neighboring anchor in range of said anchor, said start time.

19. The system of claim 17, wherein, each anchor is configured to, upon detecting that the corresponding ranging slot time period of the anchor collides with the corresponding ranging slot time period of the neighboring anchor, randomly select a new corresponding ranging slot time period.

20. The system of claim 11, wherein the transceiver of the serving anchor is turned on at the start of said ranging slot time period and turned off after said ranging slot time period to conserve power.

* * * * *